(12) United States Patent
Okimoto et al.

(10) Patent No.: US 8,083,255 B2
(45) Date of Patent: Dec. 27, 2011

(54) VEHICLE AIR BAG SYSTEM

(75) Inventors: Kohei Okimoto, Wako (JP); Masatoshi Yokota, Tokyo (JP)

(73) Assignees: Honda Motor Co., Ltd., Tokyo (JP); Takata Corporation, Tokyo (JP)

( * ) Notice: Subject to any disclaimer, the term of this patent is extended or adjusted under 35 U.S.C. 154(b) by 95 days.

(21) Appl. No.: 12/682,436

(22) PCT Filed: Oct. 8, 2008

(86) PCT No.: PCT/JP2008/068284
§ 371 (c)(1),
(2), (4) Date: Apr. 9, 2010

(87) PCT Pub. No.: WO2009/048069
PCT Pub. Date: Apr. 16, 2009

(65) Prior Publication Data
US 2010/0207369 A1    Aug. 19, 2010

(30) Foreign Application Priority Data
Oct. 9, 2007   (JP) .................. 2007-263475

(51) Int. Cl.
*B60R 21/213* (2006.01)
*B60R 21/20* (2006.01)

(52) U.S. Cl. .............. 280/730.2; 280/728.2; 280/736

(58) Field of Classification Search ........... 280/736, 280/728.2, 730.2; *B60R 21/20*
See application file for complete search history.

(56) References Cited

U.S. PATENT DOCUMENTS

| 6,022,044 A * | 2/2000 | Cherry .................. 280/730.2 |
| 7,159,896 B2 * | 1/2007 | Ochiai et al. ............. 280/730.2 |
| 7,163,231 B2 * | 1/2007 | Kumagai ................ 280/730.2 |
| 7,328,911 B2 * | 2/2008 | Chapman ............... 280/728.2 |
| 7,357,408 B2 * | 4/2008 | Hall et al. ............... 280/728.2 |
| 7,780,187 B2 * | 8/2010 | Minamikawa .......... 280/728.2 |
| 2004/0000775 A1 * | 1/2004 | Henderson et al. ...... 280/730.2 |
| 2008/0048418 A1 * | 2/2008 | Remley et al. .......... 280/728.2 |
| 2009/0302581 A1 * | 12/2009 | Yokota et al. ........... 280/728.2 |

FOREIGN PATENT DOCUMENTS
JP    11-321532    11/1999
JP    2004-098707   4/2004

* cited by examiner

*Primary Examiner* — Ruth Ilan
(74) *Attorney, Agent, or Firm* — Rankin, Hill & Clark LLP

(57) ABSTRACT

A vehicle air bag system, which can facilitate confirmation of a state of an introduction part of an air bag housed in a cover, includes an air bag having an introduction part into which an inflator is inserted, and a general part that inflates and expands vertically downward in a vehicle interior. A cover houses the introduction part and the general part in parallel. An observation window is formed in the cover at a position corresponding to the introduction part.

3 Claims, 4 Drawing Sheets

US 8,083,255 B2

VEHICLE AIR BAG SYSTEM

CROSS REFERENCE TO RELATED APPLICATIONS

This application claims the foreign priority benefit under Title 35, United States Code, 119(a)-(d) of Japanese Patent Application No. 2007-263475, filed on Oct. 9, 2007 in the Japan Patent Office, the disclosure of which is herein incorporated by reference in its entirety.

BACKGROUND OF THE INVENTION

1. Field of the Invention

The present invention relates to a vehicle air bag system that expands at the time of a vehicle collision to protect an occupant.

2. Description of Related Art

Conventionally, an occupant protection device (or referred to an air bag device) is disclosed, in which an air bag is disposed in a folded state at an upper portion of a door opening of a vehicle. The occupant protection device expands the air bag vertically downward by gas injection from an inflator to protect an occupant when an impact is applied onto the vehicle.

For example, Japanese Patent Publication No. 3113977 describes a side air bag device which is disposed extendedly between a front pillar and a roof side rail at peripheries of doors or windows. In the air bag device, a twist determination means is provided around an air bag housed in a folded state, so as to easily confirm the installation state of the air bag.

Further, Japanese Patent Publication No. 3894482 describes an air bag body module in which an air bag is formed in a folded state. Here, a marking for determining whether the air bag is twisted or not is provided with the air bag body module. In addition, another marking for determining whether the air bag is twisted or not is provided with a cover member that locally covers the air bag body module in a longitudinal direction thereof.

However, when an air bag is folded to be elongated, the air bag has a long and narrow shape and is liable to be bent. Accordingly, it is difficult to manage quality of the air bag, particularly prior to an installation of the air bag on a vehicle body. For that reason, the folded air bag in a whole length is housed in a cover made of resin so as to facilitate handling of the air bag.

An inflator, which inflates and expands an air bag vertically downward, is generally inserted into an introduction part having a cylinder-like shape formed protruding from an upper portion of the air bag.

However, there is a case that the introduction part is housed in a twisted state because the introduction part formed protruding from the upper portion of the air bag is liable to be twisted, when the folded air bag is housed in the cover in a state that the inflator is inserted into the introduction part. Further, there is also a case that the introduction part is twisted by being vibrated, when the air bag device is transported while the air bag is housed (or modularized) in the cover.

When the introduction part is twisted, the air bag does not expand smoothly since gas from the inflator is not injected smoothly. Hereby, detachment of the introduction part from the inflator can be occurred. However, it is difficult to confirm the state of the introduction part since the upper portion of the air bag including the introduction part is covered with the cover.

SUMMARY OF THE INVENTION

The present invention is accomplished in view of the foregoing problems. An object of the present invention is to provide a vehicle air bag system, which can facilitate confirmation of a state that an introduction part of an air bag is housed in a cover.

According to the present invention, a vehicle airbag system comprises an air bag which includes an introduction part into which an inflator is inserted and that injects gas and a general part which inflates and expands vertically downward in a vehicle interior; a cover which houses the introduction part and the general part in parallel. Herein, an observation window is formed in the cover at a position corresponding to the introduction part.

According to the above mentioned structure, the observation window is formed in the cover at a position corresponding to the introduction part. Therefore, it is possible to confirm whether the introduction part is twisted or not through the observation window, after the air bag is housed in the cover.

It is desirable that the observation window is a through-hole that is formed in the cover.

Further, it is desirable that a band binding the inflator and the introduction part is disposed at a position which can be observed through the observation window.

According to the above mentioned structure, the band binding the inflator and the introduction part is disposed at a position which can be observed through the observation window. Hereby, it is possible to confirm a state of the band binding the inflator and the introduction part through the observation window.

Further, it is desirable that a stitched line that is approximately parallel to an extending direction of the general part is provided with the introduction part at a position which can be observed through the observation window.

According to the above mentioned structure, the stitched line that is approximately parallel to the extending direction of the general part is provided with the introduction part at a position which can be observed through the observation window. Hereby, it is possible to easily determine whether the introduction part is twisted or not by comparing the extending direction of the stitched line to the extending direction of the general part.

Further, it is desirable that marks for indicating an allowable range of the twist of the introduction part are provided at a side edge of the observation window, the side edge intersecting with the stitched line.

According to the above mentioned structure, it is possible to easily conclude that the twist of the introduction part is acceptable if the end of the stitched line is located within the range of the width between the marks, with allowing a small twist of the introduction part.

According to the present invention, it is possible to easily confirm whether the introduction part housed in the cover is twisted or not.

BRIEF DESCRIPTION OF THE DRAWINGS

FIG. 4A shows a state that an introduction part is not twisted. FIG. 4B shows a state that the introduction part is twisted. FIG. 4C shows a modified example of the present embodiment.

DETAILED DESCRIPTION OF THE PREFERRED EMBODIMENT

Next, an embodiment of the present invention will be explained in reference to the attached drawings. Hereinafter, the same number is used for the same element and overlapped descriptions will be omitted.

Figure 1:
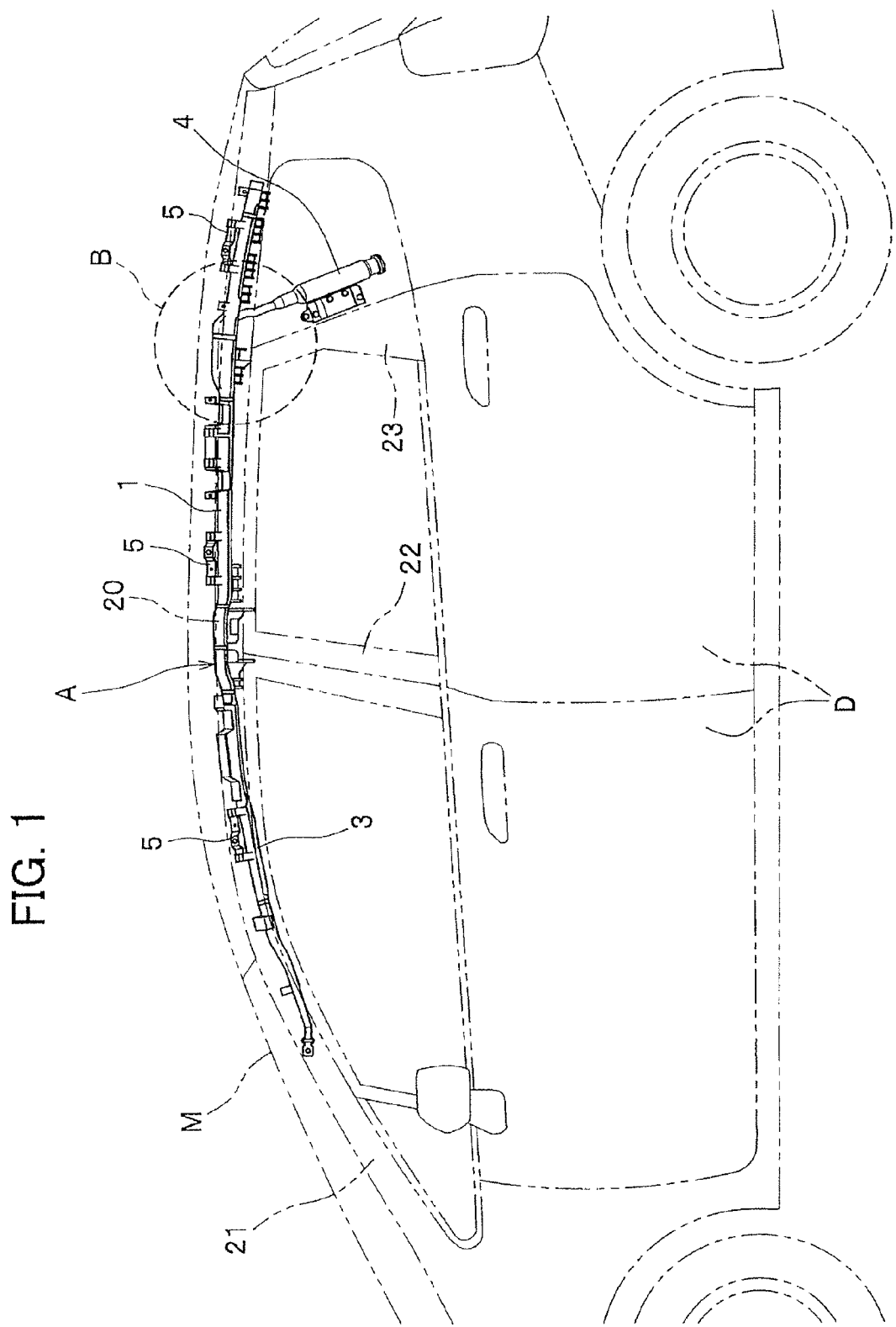
FIG. 1 is a side view of a vehicle air bag system of the present embodiment, showing the vehicle air bag system disposed on a right side of the vehicle, which is seen from a left side of the vehicle.
Figure 2:
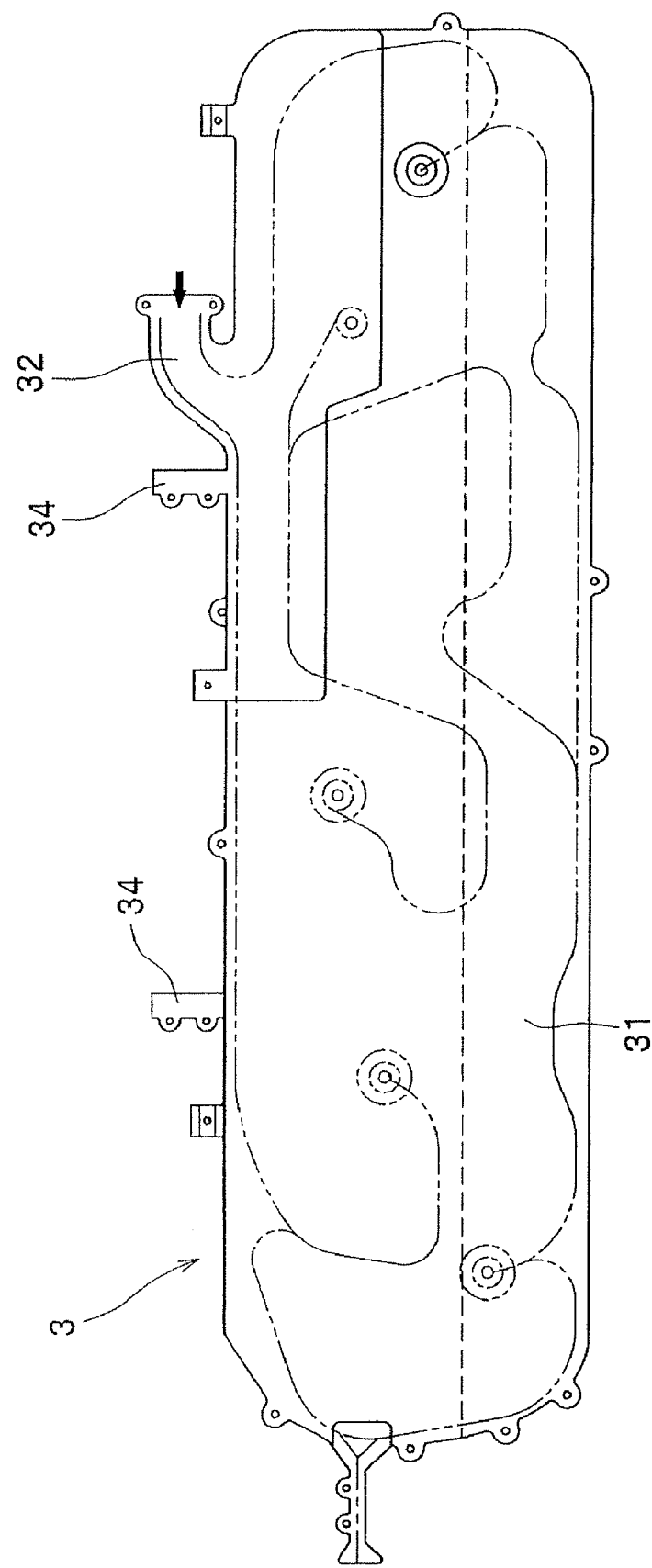
FIG. 2 is a diagram showing the air bag in a state that the air bag is expanded.
Figure 3:
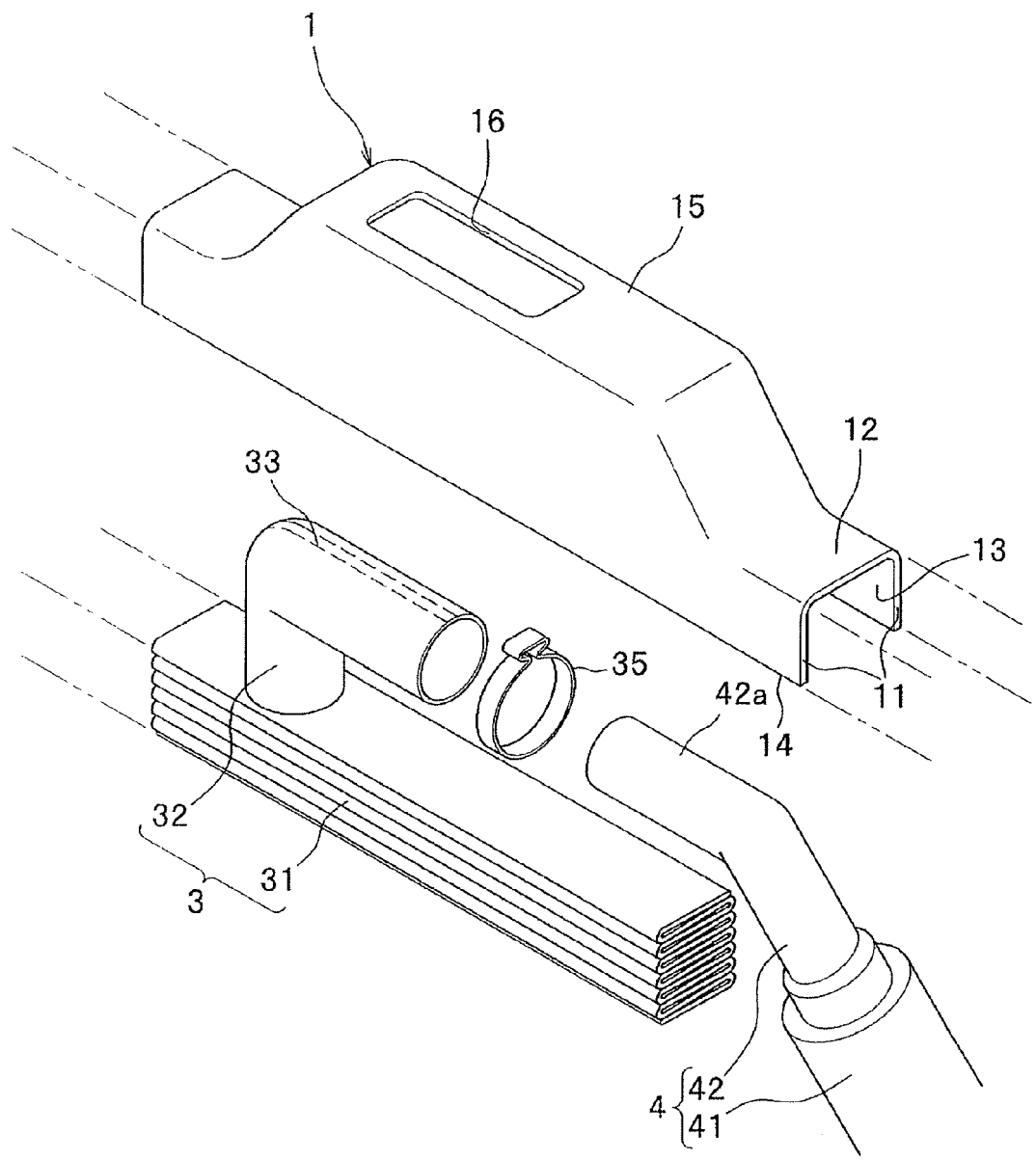
FIG. 3 is an exploded perspective view showing an enlarged B part in FIG. 1.
Figure 4A:
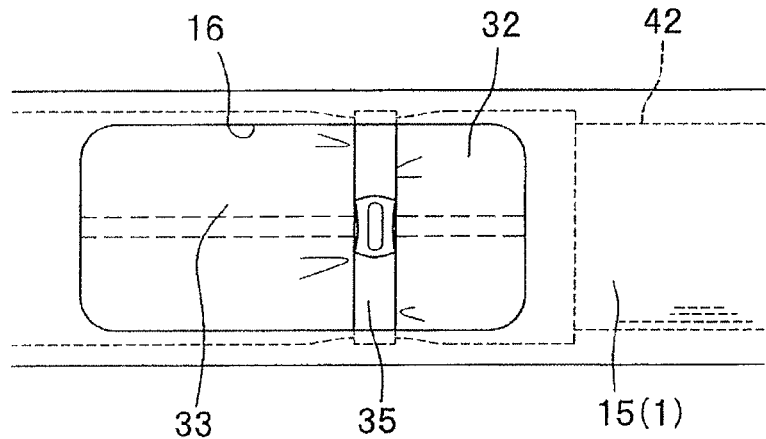
FIGS. 4A, 4B and 4C are plan views of an observation window.
Figure 4B:
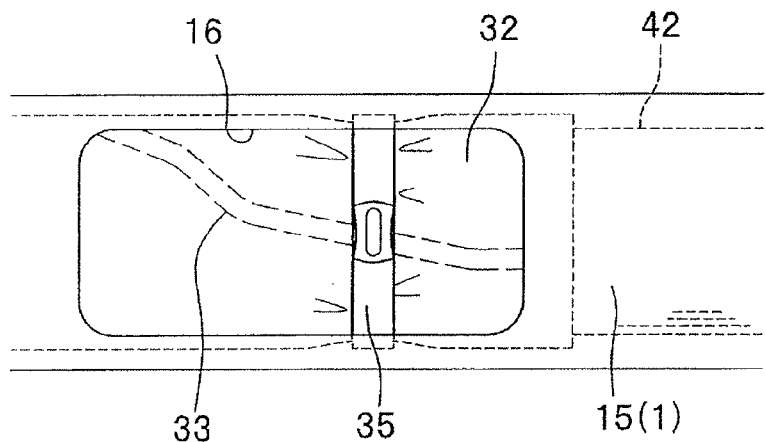
Figure 4C:
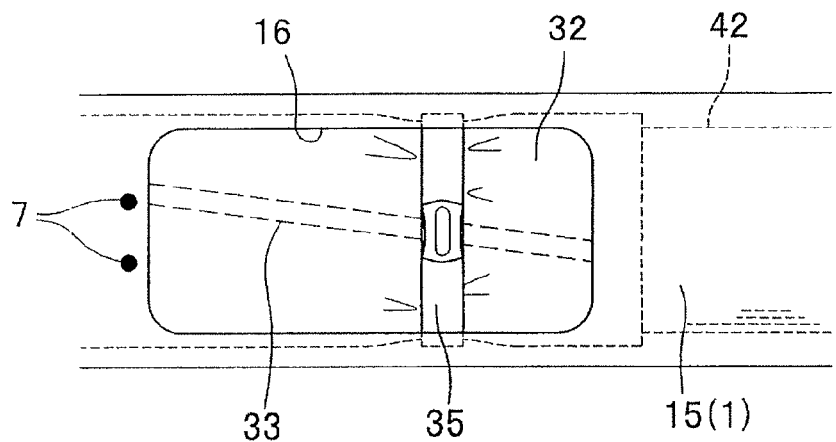

FIG. 1 is a side view of a vehicle air bag system of the present embodiment, showing the vehicle air bag system disposed on a right side of the vehicle, which is seen from a left side of the vehicle. FIG. 2 is a diagram showing the air bag in a state that the air bag is expanded. FIG. 3 is an exploded perspective view showing an enlarged B part in FIG. 1. FIGS. 4A, 4B and 4C are plan views of an observation window. FIG. 4A shows a state that an introduction part is not twisted. FIG. 4B shows a state that the introduction part is twisted. FIG. 4C shows a modified example of the present embodiment.

Herein, when a direction is described in the explanation, the direction is shown based on a direction defined by front and rear sides of the vehicle, right and left sides of the vehicle, and, up and down sides of the vehicle. Further, a pair of the air bag systems for a vehicle A are provided respectively on the right and the left sides of the vehicle M. Therefore, hereinafter, descriptions will be provided only on the vehicle air bag system A on the right side of the vehicle M, and descriptions on the vehicle air bag system A on the left side of the vehicle M will be omitted since each system has the identical structure.

As shown in FIG. 1, the vehicle air bag system A is a system for protecting an occupant at the time of a vehicle collision by instantly expanding the air bag. The air bag system mainly includes, the air bag 3, the cover 1 which houses the air bag 3 in a folded state, and the inflator 4 which expands the air bag 3. The air bag 3, the cover 1, and the inflator 4 are modulated and can be handled integrally.

The vehicle air bag system A is disposed at the upper portion of the doors of the vehicle M, extending from the front side to the rear side of the vehicle M. Specifically, the vehicle air bag system A is provided along the roof side rail 20 extending from the front pillar 21 in the vehicle interior of the vehicle M. The vehicle air bag system A is fixed onto the vehicle M via a plurality of brackets 5 provided with the upper portions of the cover 1. The vehicle air bag system A is covered up with the pillar garnish and the roof garnish not shown.

As shown in FIGS. 2 and 3, the air bag 3 is a member inflating and expanding by gas injection from the inflator 4. The air bag 3 includes the general part 31 formed to be bag-like having an approximately rectangular shape in a side view, and the introduction part 32 formed to be cylinder-like into which the inflator 4 is inserted and that injects gas into the general part 31. The air bag 3, for example, is formed to be bag-like using two sheets stitched with each other.

The general part 31, in a normal condition, is housed in a folded state in the groove 13 of the cover 1. The general part 31 is bound in the cover in a folded state, by belt-like bodies (not shown) provided at a plurality of predetermined positions along a longitudinal direction of the cover 1. Further, the general part 31 inflates and expands from the upper portion to the down portion of the doors D along the vehicle interior side of the doors D, by gas injection from the inflator 4 at the time of a vehicle collision. Here, the belt-like bodies (not shown) are broken up following the inflation and expansion of the general part 31.

The introduction part 32 is formed protruding from the upper portion of the general part 31. The introduction part 32, for example, is formed to be cylinder-like using two sheets stitched each other. The introduction part 32, having a reversed L-shape in a side view, is formed extending upward from the upper portion of the general part 31, then bent by approximately 90° toward a rear side.

As shown in FIG. 2, a pair of engagement pieces 34 and 34 are formed on the upper portion of the air bag 3 apart from each other in a longitudinal direction of the airbag 3. The engagement pieces 34 and 34 protrude from small holes formed in the upper portion of the cover 1, and are engaged with hanging metal pieces (not shown) for hanging the air bag 3 on the vehicle M.

As shown in FIG. 3, a straight stitched line 33 is formed on the outer peripheral surface of the introduction part 32. In the present embodiment, the stitched line 33 is formed along the ridgeline of the upper surface side of the introduction part 32. The stitched line 33 is formed approximately parallel to the extending direction of the general part 31 (that is, a longitudinal direction of the vehicle M). The stitched line 33 has a function as a mark (or marking) so as to confirm whether the introduction part 32 is twisted or not.

An introduction tube 42 of the inflator 4 is inserted into the introduction part 32. The introduction part 32 is fastened from outside by the band 35 in a state that the introduction tube 42 is inserted therein. Thus, the introduction part 32 is not detached from the introduction tube 42.

As shown in FIGS. 1 and 3, the inflator 4 includes an inflator main body 41 which generates gas at the time of a collision of the vehicle M, and the introduction tube 42 which injects the generated gas into the air bag 3. The inflator main body 41 is fixed on a quarter pillar 23 of the vehicle M. The introduction tube 42 is a pipe having a circle cross-section, and is provided along the quarter pillar 23, extending from the upper end of the inflator main body 41 to the upper portion of the air bag 3. An end portion 42a of the introduction tube 42 facing to the air bag 3 is folded to come along the upper surface of the air bag 3, and is inserted into the introduction part 32.

As shown in FIGS. 1 and 3, the cover 1 is a member for housing the air bag 3 in a folded state. The cover 1 is a long member having an approximately up-side-down U shaped cross-section. The cover 1 includes a pair of vertical walls 11 and 11, and a lateral wall 12 connecting each upper end of the vertical walls 11 and 11. The cover 1 houses the air bag 3 in the groove 13 surrounded by the pair of vertical walls 11 and 11 and the lateral wall 12. The cover 1 houses the general part 31 and the introduction part 32 of the air bag 3 in parallel. More specifically, the introduction part 32 is housed in the groove 13 of the cover 1 in a state parallel to a longitudinal direction of the general part 31. The cover 1, for example, is formed of a synthetic resin, and prevents the air bag 3 housed in a folded state from being bent and deformed.

The cover 1 is installed on the vehicle M in a state that an opening 14 faces vertically downward. The air bag 3 housed in a folded state inflates and expands through the opening 14 vertically downward.

As shown in FIG. 3, at a portion of the cover 1 corresponding to a connection part that connects the introduction part 32 and the introduction tube 42, a protruding part 15 is formed to be protruded upward in comparison to other portions of the cover 1. That is, the connection part connecting the introduction part 32 and the introduction tube 42 is covered up with the protruding part 15.

An observation window 16, which is a through-hole having a rectangular shape in a plan view, is formed on the upper surface of the protruding part 15. The stitched line 33 of the introduction part 32 and the band 35 are observed through the observation window 16. That is, it is possible to visibly confirm a state of the introduction part 32 through the observation window 16, even after the cover 1 is attached to cover up the air bag 3.

Next, with reference to FIG. 4, descriptions will be provided on the effect of the vehicle air bag system A of the present embodiment. When the introduction part 32 is not twisted, the stitched line 33 formed on an outer peripheral surface of the introduction part 32 appears through the observation window 16 in a state being approximately parallel to the extending direction of the general part 31 (that is, the longitudinal direction of the vehicle M) as shown in FIG. 4A. Therefore, in other words, it is possible to conclude that the introduction part 32 is not twisted, if the stitched line 33 is observed as being parallel to the extending direction of the general part 31 when the introduction part 32 is observed through the observation window 16.

On the other hand, when the introduction part 32 is twisted, the stitched line 33 formed on the outer peripheral surface of the introduction part 32 appears through the observation window 16 in a state intersecting with (or being non-parallel to) the extending direction of the general part 31 (that is, the longitudinal direction of the vehicle M) as shown in FIG. 4B. Therefore, in other words, it is possible to conclude that the introduction part 32 is twisted, if the stitched line 33 is observed as intersecting with (or being non-parallel to) the extending direction of the general part 31 when the introduction part 32 is observed through the observation window 16.

Further, it is possible to confirm whether the band 35 is loosened or detached to be dropped since the band 35 is disposed at a position that can be observed through the observation window 16.

Here, the stitched line 33 is used as a mark (or marking) for confirming whether the introduction part 32 is twisted or not. Hereby, it is possible to produce the introduction part 32 and to set the mark in one step, resulting in improvement of the production efficiency of the air bag system A.

As mentioned above, according to the vehicle air bag system A of the present embodiment, it is possible to visibly confirm the state of the introduction part 32 and the band 35 prior to installation of the air bag 3 on the vehicle M, even after the air bag 3 in a folded state is housed in the cover 1. Hereby, it is possible to prevent the vehicle air bag system A from being installed on the vehicle M in an inappropriate state. Accordingly, the soundness of the vehicle air bag system A can be ensured.

As mentioned above, detailed descriptions have been provided on the embodiment of the present invention, with reference to the attached drawings. However, the present invention is not limited to the embodiment, and various modifications can be applied within the scope and spirit of the present invention.

For example, in the above mentioned embodiment, the observation window 16 is formed as a through-hole. However, the observation window 16 may be formed by fitting a transparent member into the through-hole, or by providing a cover member with the through-hole to be opened or closed. By having the above mentioned structure, it is possible to prevent the introduction part 32 from contacting with other members and being twisted. Alternatively, a portion (for example, an upper surface) of the protruding part 15 may be formed of a transparent material in two colors.

Further, in the above mentioned embodiment, the twist of the introduction part 32 is confirmed by determining whether the stitched line 33 of the introduction part 32 is parallel or not to the extending direction of the general part 31. However, the present invention is not limited to the embodiment. That is, a small twist of the introduction part 32 may be allowable.

For example, as shown in FIG. 4C, a pair of marks 7 and 7 may be provided at a front or a rear side edge of the observation window 16, having a predetermined width between the marks. Herein, it is possible to conclude that the twist of the introduction part 32 is acceptable when the end of the stitched line 33 is positioned within a range of the width between the marks 7 and 7. Alternatively, the observation window 16 may be formed such that a width of the observation window 16 itself is the same as the predetermined width.

What is claimed is:

1. A vehicle air bag system comprising:
   an air bag that includes an introduction part into which an inflator is inserted and that injects gas, and a general part that inflates and expands vertically downward in a vehicle;
   a cover that houses the introduction part and the general part in parallel, wherein
   an observation window is formed in the cover at a position corresponding to the introduction part; and
   wherein a stitched line that is approximately parallel to an extending direction of the general part is provided with the introduction part at a position observed through the observation window.

2. The vehicle air bag system according to claim 1, wherein a band binding the inflator and the introduction part is disposed at a position observed through the observation window.

3. The vehicle air bag system according to claim 1, wherein marks for indicating an allowable range of a twist of the introduction part are provided at a side edge of the observation window, the side edge intersecting with the stitched line.

* * * * *